Apr. 17, 1923.
1,451,869
D. B. DE LAND
KEY OPENING CAN
Filed Dec. 31, 1921
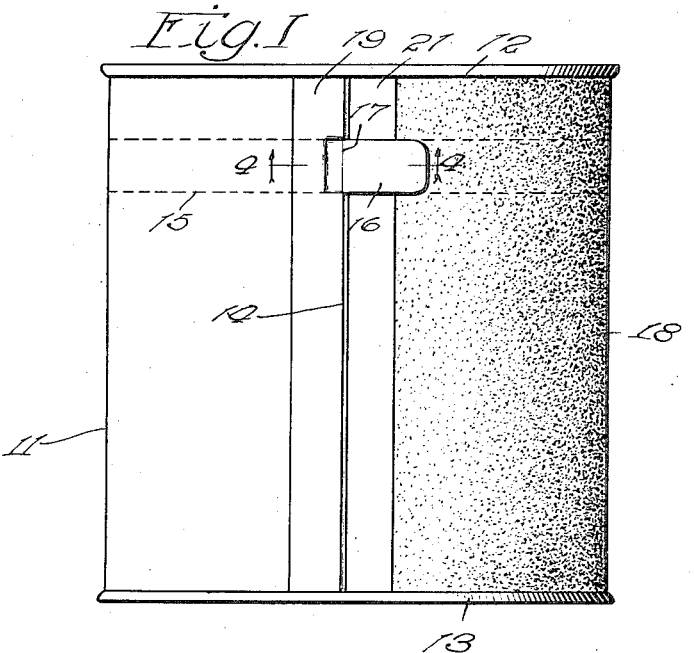
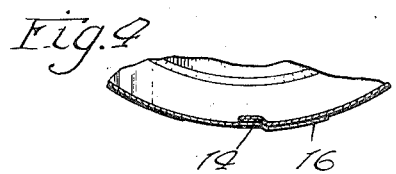
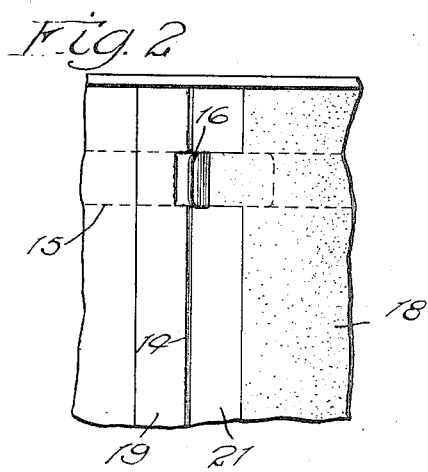
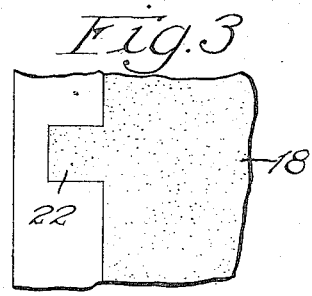
Inventor
Daniel B. DeLand
By Munday, Clarke & Carpenter
Attys.

Patented Apr. 17, 1923.

1,451,869

UNITED STATES PATENT OFFICE.

DANIEL B. DE LAND, OF FAIRPORT, NEW YORK, ASSIGNOR TO AMERICAN CAN COMPANY, OF NEW YORK, N. Y., A CORPORATION OF NEW JERSEY.

KEY-OPENING CAN.

Application filed December 31, 1921. Serial No. 526,300.

*To all whom it may concern:*

Be it known that I, DANIEL B. DE LAND, a citizen of the United States, residing in Fairport, in the county of Monroe and State of New York, have invented a new and useful Improvement in Key-Opening Cans, of which the following is a specification.

This invention relates in general to containers, and more specifically to that type of container provided with a key-opening or tearing strip having a tongue extending from the body at a side seam which is subjected to soldering in closing.

A principal object of the invention is the provision of means for preventing the tongue, in a container of the character described, from being soldered to the body in the soldering operation upon the side seam, thus keeping it free for ready engagement in opening.

A further object of the invention is the provision of means for preventing solder from adhering to the tin at points where adherence would interfere with the use of the container.

Numerous other objects and advantages of the invention will be apparent as it is better understood from the following description, which, taken in connection with the accompanying drawings, discloses a preferred embodiment thereof.

Referring to the drawings,

Figure 1 is a side elevation of a container in which my invention is embodied;

Fig. 2 is a detail view of a portion of the side seam, the tongue being lifted from the body;

Fig. 3 is a detail view of a portion of the body, showing the lithographed area which extends beneath the tongue; and Fig. 4 is a sectional view, taken substantially upon the line 4—4 in Fig. 1.

Upon the drawings, which illustrate the invention, I have shown a container body 11 having ends 12 and 13, permanently secured thereto by double seaming, or in any preferred manner. A side seam 14 is employed to close the body blank in the usual cylindrical form, and a key-opening or tearing strip 15 extends about the upper part of the body. A tongue 16 extends from this strip a distance about the exterior of the can, taking off from said body at the point 17 which is adjacent the seam 14. In closing said seam it is customary to apply solder thereto by means of an external roll and this results in the spreading of the solder over a considerable area about the seam. This normally would tend to bind the tongue 16, a portion of which falls within the soldered area, to the container body, thus rendering engagement and lifting thereof by a key, or otherwise, difficult. The main portion of the body of the container is lithographed, as indicated at 18, but it is the practice to leave spaces 19 and 21 on either side of the side seam which are not lithographed. I have found that solder will not adhere to a lithographed surface, and I have, therefore, provided a lithographed area 22, which in the present instance, is merely an extension from the main lithographed portion of the body, extending beneath the tongue 16 and into the space 21, the remainder of which is not lithographed. In this manner the tongue 16 is kept loose since the solder will not adhere to the lithographed area. Therefore, said tongue may be readily engaged for opening, and is not held close to the can body as it otherwise would be by the solder applied to the seam 14.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A container, comprising a body provided with a soldered side seam, a tearing strip extending about said body and having a tongue extending from said seam, and a lithographed area on the container body beneath said tongue at a point where the same is subjected to the soldering action upon said side seam.

2. A container, comprising a lithographed body having a soldered side seam adjacent which the material of the body is not lithographed, a tearing strip tongue extending from the body at said seam, and a lithographed area beneath a portion of said tongue subjected to the soldering action upon said seam and extending into said unlithographed space.

3. A container, comprising a lithographed body provided with a side seam adjacent which the material of the body is not lithographed, said seam and the unlithographed portion of said body having solder applied thereto in the process of closing the seam, and a tearing strip tongue extending from the body at said seam, said body being provided with a lithographed area extending beneath the portion of said tongue subjected to said soldering process in closing the seam.

4. A container, provided with an opening strip tongue, a portion of which is subjected to soldering action in forming the container, and a lithographed area beneath said tongue to prevent the same from being soldered to the container body.

5. A container, comprising a lithographed body provided with a side seam having an unlithographed portion adjacent thereto, an opening strip tongue extending from the body at said seam, and an extension of the lithographed area beneath said tongue to prevent the latter being soldered to the container body when solder is applied to the unlithographed area adjacent said seam in closing the latter.

6. A container, comprising a lithographed body provided with a side seam having an unlithographed portion adjacent thereto, an opening strip tongue extending from the body at said seam, and a lithographed area beneath said tongue to prevent the latter being soldered to the container body when solder is applied to the unlithographed area adjacent said seam in closing the latter.

DANIEL B. DE LAND.